United States Patent
Rodrigo et al.

(10) Patent No.: US 7,539,140 B2
(45) Date of Patent: May 26, 2009

(54) METHOD TO DETERMINE AVERAGE NUMBER OF PACKETS PER BURST FOR TRANSMISSION OF DATA PACKETS THROUGH A NETWORK

(75) Inventors: Miguel De Vega Rodrigo, Brussels (BE); Robert Pleich, München (DE)

(73) Assignee: Nokia Siemens Networks GmbH & Co KG, Munich (DE)

( * ) Notice: Subject to any disclaimer, the term of this patent is extended or adjusted under 35 U.S.C. 154(b) by 634 days.

(21) Appl. No.: 10/570,009

(22) PCT Filed: Aug. 18, 2004

(86) PCT No.: PCT/EP2004/051824

§ 371 (c)(1),
(2), (4) Date: Feb. 28, 2006

(87) PCT Pub. No.: WO2005/022842

PCT Pub. Date: Mar. 10, 2005

(65) Prior Publication Data

US 2007/0019655 A1 Jan. 25, 2007

(30) Foreign Application Priority Data

Aug. 28, 2003 (EP) .................... 03019475

(51) Int. Cl.
*H04L 12/26* (2006.01)
*H04L 12/56* (2006.01)
*H04J 3/18* (2006.01)

(52) U.S. Cl. .................... 370/235; 370/477; 370/395.41
(58) Field of Classification Search ................ 370/229, 370/230, 230.1, 235, 351, 389, 400, 401; 398/43, 45, 48, 51; 375/E7.001, E7.026, 375/E7.126, E7.132
See application file for complete search history.

(56) References Cited

U.S. PATENT DOCUMENTS 7,330,432 B1 * 2/2008 Revsin et al. ................ 370/235
2003/0099243 A1 5/2003 Oh et al.

OTHER PUBLICATIONS

M. Izal and J. Aracil: "On the Influence of Self-Similarity on Optical Burst Switching Traffic"; Globecom '02, 2002—IEEE Global Telecommunications Conference; Nov. 17, 2002; pp. 2308-2312; vol. 1 of 3; XP010636160; ISBN: 0-7803-7632-3.

(Continued)

*Primary Examiner*—Pankaj Kumar
*Assistant Examiner*—Weibin Huang
(74) *Attorney, Agent, or Firm*—Dickinson Wright, PLLC; Kevin R. Spivak

(57) ABSTRACT

The data packets with a maximum allowable delay and an average packet rate are aggregated in a node of the network of a burst and the burst is transmitted with a number of packets. The number of packets per burst is determined by the result of plus/minus twenty percent of the sum of the value one plus a product of the maximum allowable delay, the average packet rate and the value two.

17 Claims, 1 Drawing Sheet

OTHER PUBLICATIONS

Vinod M. Vokkarane, Karthik Haridoss, and Jason P. Jue; "Threshold-Based Burst Assembly Policies for QoS Support in Optical Burst-Switched Networks"; Proceedings of the SPIE; 2002; pp. 1-11; vol. 4874; XP002269170; ISSN: 0277-786X; Bellingham, VA, US.

Myungsik Yoo and Chunming Qiao; "A New Optical Burst Switching Protocol For Supporting Quality Of Service", Proceedings of the SPIE: Nov. 1998; pp. 396-405; vol. 3531; XP000950072; ISSN: 0277-786X; Bellingham, VA, US.

* cited by examiner

METHOD TO DETERMINE AVERAGE NUMBER OF PACKETS PER BURST FOR TRANSMISSION OF DATA PACKETS THROUGH A NETWORK

CROSS REFERENCE TO RELATED APPLICATIONS

This application is the US National Stage of International Application No. PCT/EP2004/051824, filed Aug. 18, 2004 and claims the benefit thereof. The International Application claims the benefits of European application No. 03019475.7 EP filed Aug. 28, 2003, both of the applications are incorporated by reference herein in their entirety.

FIELD OF INVENTION

The present invention relates to a method for transmission of data packets through a network.

BACKGROUND OF INVENTION

In networks, like Optical Burst-Switched (OBS) networks or optical networks, packets, e.g. Internet Protocol (IP) packets, Asynchrony Transfer Mode (ATM) cells or protocol data units (PDUs), are aggregated to bursts, like electrical or optical bursts, in order to be transferred through the network. The conversion of packets into bursts takes place in a node, like an edge node, of the network according to a certain aggregation strategy. The solutions so far provide two main aggregation strategies: the aggregation strategy with timeouts and the aggregation strategy with buffer limit.

First we will discuss the aggregation strategy with timeouts. A schematic example 100 is shown in FIG. 1. In this scheme, packets 102 are added or padded to a burst 104 which is being generated in a buffer 106 until a certain timer T expires. Then the burst 108 is sent.

The second aggregation strategy 200 with buffer limit will be discussed with reference to FIG. 2. In this scheme, packets 202 are added or padded to a burst 204 which is being generated in a buffer 206 until the buffer is full. Then the burst 208 is sent.

Once the packets are transformed into bursts and sent into the network, they travel in the network through a series of switches, like electrical or optical switches, depending on the network, to a certain destination. At best, these switches have limited storage capabilities, e.g. in case of optical switches fiber delay lines, and at worst, no storage capabilities at all in the normal case. Therefore, collisions among bursts occur. In a switch are two possible causes for the blocking of a burst.

First there is blocking due to switching time. A switch needs a certain time $t_s$ in order to process the header of an incoming burst and to prepare the switching elements so that the burst will be sent to the adequate output and channel, in case of optical switches to the corresponding fiber and wavelength. This switching time $t_s$ is technology dependent. The blocking due to switching time occurs when a burst comes before the switching time $t_s$ is elapsed.

Second there is blocking due to burst overlapping. In general, a switch has a limited number of m channels per connection, in case of optical switches m wavelengths per optical fiber, going to a certain destination. A burst is blocked when on a certain outgoing connection all the m channels are busy, e.g. on a fiber all the m wavelengths are busy.

On the other hand the burst generation time at the nodes is the main cause for the delay that a packet experiences. The burst generation time is the time that a packet has to wait in the buffer at the node until the burst to which it belongs is completely generated.

SUMMARY OF INVENTION

Major performance parameters of a network are thus the burst blocking probability, the throughput and the delay.

The two main aggregation strategies timeout and buffer limit have the disadvantage of a certain blocking probability and an achievable throughput.

It is an object of the invention to determine the number of packets per burst for a given maximum allowable delay of the packets and an average packet rate.

This object is achieved by the features recited in the claims.

The advantage of the invention is, that an optimum number of packets per burst is determined. In a network this number of packets per burst leads to a lower blocking probability in the optical switches and to a higher throughput.

Further developments of the invention are identified in the dependent claims.

In an embodiment of the invention the number of packets per burst is used to determine the average burst size and the average burst rate. This has the advantage, that the parameters for calculating the traffic in the network are determined.

In an other embodiment of the invention the number of packets per burst is used to determine the relevant parameters for different aggregation strategies, like buffer limit and random selection. This has the advantage, that for every aggregation strategy the relevant parameters are determined to generate the optimum number of packets per burst, in order to achieve a minimum blocking in the switches, to maximize the throughput in the network and to remain below the maximum delay for a packet.

In an other embodiment of the invention the determined number of packets per burst and out of this the resulting average burst rate is verified by an expression, using the inverse Erlang B formula for a given number of m channels, a given burst blocking probability, a switching time and a burst duration time. This has the advantage, that the determined result for the number of packets per burst respectively the average burst rate is verified by an independent formula.

The inventor found out, that for a given maximum allowable delay for an incoming packet and an average packet rate of the incoming packets the optimum number of packets per burst ppb is given by plus/minus twenty percent of the sum of two terms, where the first term is the value one and the second term is a product of the maximum allowable delay mad for a packet, the average packet rate apr and the value two.

$$ppb = 1 + 2 \cdot mad \cdot apr \quad \text{Equation 1}$$

Beyond, for a transmission of data packets through a network, where said packets with a maximum allowable delay mad, an average packet rate apr and an average packet size aps are aggregated in a node of the network to a burst and the burst is transmitted with an average number of packets and a link speed ls into the network and passes at least a switch of the network, with a number of channels noc, a switching time $t_s$ and a given burst blocking probability bbp, the average number of packets per burst ppb should be between an upper and a lower limit.

The upper limit of the average number of packets per burst $ppb_u$ should be determined by plus/minus twenty percent of the sum of the value one plus a product of the maximum allowable delay mad, the average packet rate apr and the value two.

$$ppb_u = 1 + 2 \cdot mad \cdot apr \quad \text{Equation 2}$$

The lower limit of the average number of packets per burst $ppb_l$ should be determined by plus/minus twenty percent of a quotient, where the dividend is the switching time $t_s$ and the divisor is a difference, where the minuend is a quotient of the result of the inverse Erlang B formula for the burst blocking probability bbp and the number of channels noc divided by the average packet rate apr and the subtrahend is a quotient of the average packet size aps divided by the link speed ls.

$$ppb_l = \frac{t_s}{\frac{E_{noc}^{-1}(bbp)}{apr} - \frac{aps}{ls}} \qquad \text{Equation 3}$$

Further on, an average burst size abs is given by the product of an average packet size aps of the incoming packets and the number of packets per burst ppb as determined above. The average packet size aps can be ascertained by measuring the size of the incoming packets and determine the average packet size aps. In case the incoming packets are IP packets, the results of the so called tri modal distribution for IP packets can be used. According to this distribution the average packet size aps of an IP packet is 3735 bits per IP packet.

$$abs = aps \cdot ppb \qquad \text{Equation 4}$$

The determined number of the optimum average burst size abs, as determined by the product of the average packet size aps of the incoming packets and the optimum number of packets per burst ppb as mentioned above, can be used to generate bursts with the optimum size. During the aggregation of incoming packets to a burst an effective burst size, this means the size of a burst during aggregation at a certain time, is compared to a value and if the effective burst size is equal or exceeds this value the aggregated burst is sent and the incoming packets are aggregated to a new burst. This said value is in the range between plus/minus 20 percent of the optimum average burst size abs. The optimum average burst size should be used as preferred value.

Corresponding to the aggregation strategy with buffer limit, the incoming packets can be aggregated in a buffer to a bursts. According to the above results, the minimum size of the buffer BSmin should be in the range determined by the product of the average packet size aps of the incoming packets and the difference of the number of packets per burst ppb and a first constant d, which is greater than 0 and in maximum 5, a preferred value of 1 should be used.

The maximum size of the buffer BSmax should be determined by the product of two terms, where the first term is the average packet size aps and the second term is a sum of the number of packets per burst ppb and a second constant e, which is greater than 0 and in maximum 5, a preferred value of 1 should be used.

$$BS\min = aps \cdot (ppb - d) \qquad \text{Equation 5}$$

$$BS\max = aps \cdot (ppb - e) \qquad \text{Equation 6}$$

Commensurate to the aggregation strategy with random selection, as proposed in a parallel application of the patent applicant, every time an incoming packet is stored a random binary digit, with a probability for the first and the second value of the binary digit, is generated and compared with the first value of the binary digit. If both values are equal, the stored packets are sent as a burst. In order to generate with this aggregation strategy the optimum number of packets per burst, the inventor proposes to determine the probability for the first value P(1) by the reciprocal value of the number of packets per burst ppb as determined above. The corresponding formula would be:

$$P(1) = \frac{1}{ppb} \qquad \text{Equation 7}$$

Anymore the average burst rate abr is determined by the quotient of the average packet rate apr and the number of packets per burst ppb.

$$abr = \frac{apr}{ppb} \qquad \text{Equation 8}$$

Alternatively the optimum average burst rate abr can be determined by the reciprocal value of the sum of the inverse average packet rate apr and two times the maximum allowable delay mad for a packet.

$$abr = \frac{1}{\frac{1}{apr} + 2 \cdot mad} \qquad \text{Equation 9}$$

A burst duration time $t_b$ is the duration of a burst. Considering a link speed ls and the average burst size abs, the burst duration can be determined by the average burst size abs divided by the link speed ls.

$$t_b = \frac{abs}{ls} \qquad \text{Equation 10}$$

Considering a switching time $t_s$, a burst duration time $t_b$, a limit of the burst blocking probability bbp and a given number of channels noc in a switch of the network, the average burst rate abr should satisfy the condition that the quotient of the result of the inverse Erlang B formula $E_{noc}^{-1}(bbp)$ for the limit of the burst blocking probability bbp and the number of channels noc divided by the sum of the switching time $t_s$ and the burst duration time $t_b$ is equal or greater than the average burst rate abr as determined before.

$$abr \leq \frac{E_{noc}^{-1}(bbp)}{t_s + t_b} \qquad \text{Equation 11}$$

Where $E_{noc}^{-1}(bbp)$ respectively $E_m^{-1}(x)$ is the inverse Erlang B formula for m channels, in case of OBS networks wavelengths, and for a load of x. In this case, the determined number of packets per burst respectively the resulting average burst rate satisfies the condition, that the limit of the burst blocking probability for the given parameters is not exceeded.

BRIEF DESCRIPTION OF THE DRAWINGS

An exemplary embodiment of the invention is described in greater detail below with reference to a drawing.

Shown in the drawing are.

DETAILED DESCRIPTION OF INVENTION

Figure 1:
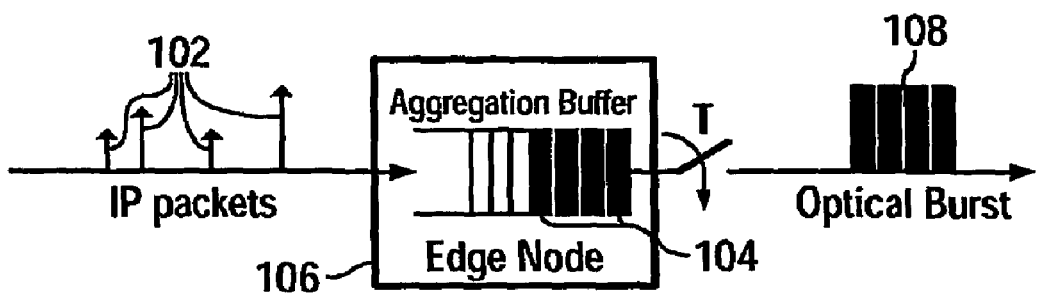
FIG. 1 the initially cited prior art.
Figure 2:
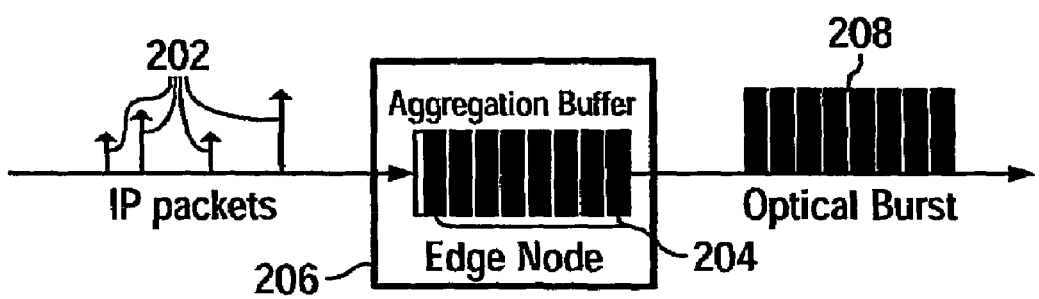
FIG. 2 the initially cited prior art.
Figure 3:
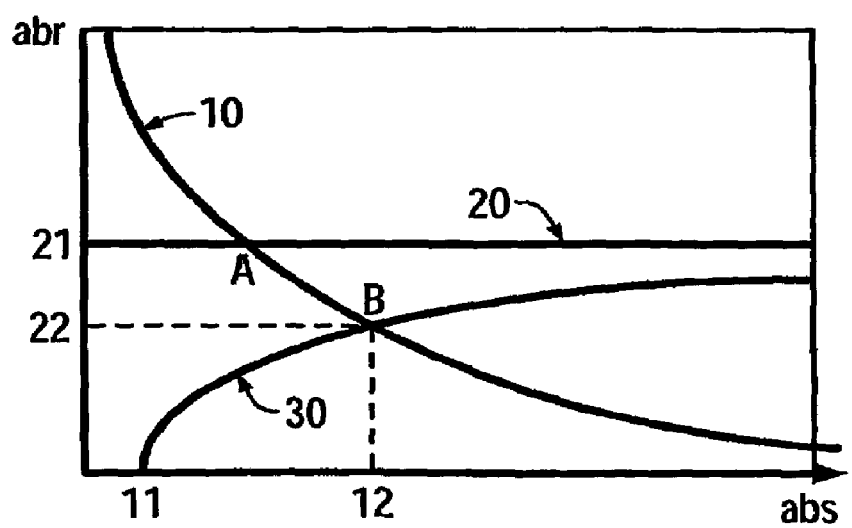
FIG. 3 a diagram with the average burst rate as a function of the average burst size.

FIG. 3 shows a diagram with three curves 10, 20, 30. On the x-axis the average burst size abs and on the y-axis the average burst rate abr is shown. Values 11, 12 for two average burst sizes are shown on the x-axis and a value 21 for an average burst rate is shown on the y-axis. The first curve 10 is a throughput curve and displays a dependency between the average burst size and the average burst rate for a given, constant throughput TP, according the following formula:

$$TP = abr \cdot abs \qquad \text{Equation 12}$$

When we move on the throughput curve to the left (smaller bursts and higher rates, the burst blocking probability increases. The frequency of bursts is higher, and therefore it is more probable that the switching time guard is not respected. The value 21 with the curve 20 imposes a maximum average burst rate for a given burst blocking probability. This leads two a maximum average burst rate and an average burst size according to the throughput curve, represented by a point A in FIG. 3.

The average number of packets per burst for point A is determined by a quotient, where the dividend is the product of the average packet rate apr and a sum of the switching time $t_s$ and the burst duration time $t_b$ and the divisor is the result of the inverse Erlang B formula for the number of channels noc and the burst blocking probability bbp.

$$ppb_a = \frac{apr \cdot (t_s + t_b)}{E_{noc}^{-1}(bbp)} \qquad \text{Equation 13}$$

When we move on the throughput curve to the right (bigger bursts and lower rates, the delay increases. The bursts are bigger and therefore a packet has to wait in average longer until the burst to which it belongs is finished. The dependency of the average burst size and the average burst rate for a given maximum allowable delay of a packet is shown by curve 30 in FIG. 3. Concerning the throughput curve 10, for a given throughput and a given maximum allowable delay the maximum average burst size and minimum average burst rate is represented by a point B in FIG. 3.

In FIG. 3, the whole segment AB fulfills the condition of maximum allowable delay and given burst blocking probability. However, due to the fact that B represents bigger burst sizes, this point B is better that any other point of the segment AB in the sense that it leads to a higher multiplexing gain. For this reason, the desired optimum should be chosen near to the point B.

According to this, the above mentioned formulas determine an optimum of the average number of packets per burst.

For an edge node of an Optical Burst Switched (OBS) network, wherein on the edge node incoming packets are aggregated to bursts, which are sent as optical bursts into the OBS network with a number of optical switches, the number of packets per burst will be determined by an example.

An edge node receives traffic, e.g. IP packets from a STM-1 link with a link speed ls of 155.52 Mbits/s. The average load al of the link may be 0.7. A tri modal distribution of the IP packets with an average IP packet size aps of 3735 bits/packet is assumed. The average maximum allowable delay mad of an IP packet in the edge node should be below 0.002 s.

We get the average packet rate:

$$apr = \frac{ls \cdot al}{aps} = \frac{155{,}52 \text{ Mbits/s} \cdot 0{,}7}{3735 \text{ bits/packet}} = 29146{,}988 \text{ packets/s}$$

The optimal number of packets per burst ppb can be found with equation 1, using c=1 and d=2:

ppb=c+d·mad·apr=1+2·0.002s·29146.988packets/s=117.588packets/burst

The optimal average burst size abs is then:

abs=ppb·aps=117.588packets/burst·3735bits/packet=439191bits/burst

The optimal average burst rate abr is:

$$abr = \frac{apr}{ppb} = \frac{29146{,}988 \text{ packets/s}}{117{,}588 \text{ packets/burst}} = 247{,}873932 \text{ bursts/s}$$

An OBS system with an optical switch receives traffic from the edge node. The switching time $t_s$ in the optical switch is 10 μs and there are 8 wavelengths (channels) available per fiber. The burst blocking probability bbp in the switch shall be kept below $10^{-6}$.

Using the inverse Erlang B formula for the number of channels noc and a blocking probability bbp of $10^{-6}$ we obtain:

$$E_8^{-1}(10^{-6}) = 0{,}7337 \text{ erlang.}$$

The average burst duration is:

$$t_b = \frac{abs}{ls} = \frac{439191 \text{ bits}}{155{,}52 \, M\text{bits/s}} = 2{,}8 \text{ ms}$$

The condition:

$$abr \leq \frac{E_{noc}^{-1}(bbp)}{t_s + t_b} => 247{,}873932 bursts/s \leq \frac{0{,}7337 erlangs}{2{,}8 \text{ms} + 0{,}002 s} = 259{,}715324 burst/s$$

is fulfilled, therefore the optimum calculated above satisfies the given burst blocking probability.

It shall be appreciated that advantages of the invention are:
  A higher throughput due to optimized burst sizes is achieved.
  A given blocking probability is satisfied.
  Due to given burst sizes, it is easier to calculate waiting times for bursts and/or headers of bursts.

The inventive method can be used to dynamically adapt the optimum number of packets per burst for given or measured average packet rates and/or average packet sizes in an edge node of the network during operation. So the number of packets per burst can be adapted due to daily traffic fluctuations.

For example, the average rate of incoming packets is measured or otherwise ascertained. Corresponding to the maximum allowable delay and the average packet rate the optimal number of packets is determined. According to this number and the used aggregation strategy, the optimal parameters for the concerning aggregation strategy are determined, e.g. for aggregation with buffer limit the requested buffer size, for aggregation with random selection the probability for the first value of the binary digit. With the inventive method these values can be dynamically readjusted, proportionately to the average incoming packet rate.

The invention claimed is:

1. A method for transmitting data packets through a communications network, the packets having a maximum allowable delay (mad), and average packet rate (apr) and an average packet size (aps), the method comprising:

aggregating a plurality of data packets in a node of the network into a burst, the burst having an average number of packets; and transmitting the burst with a link speed (ls) into the network via at least one switch having a number of channels (noc), a switching time (ts) and a given burst blocking probability (bbp), wherein the average number of packets per burst (ppb) is between an upper and a lower limit, wherein the upper limit ($ppb_u$) is calculated with the formula:

$$80\%(1+2\cdot mad\cdot apr) \leq ppb_u \leq 120\%(1+2\cdot mad\cdot apr), \text{ and}$$

wherein the lower limit ($ppb_l$) is calculated with the formula:

$$80\% \cdot \frac{t_s}{\frac{E_{noc}^{-1}(bbp)}{apr} - \frac{aps}{ls}} \leq ppb_l \leq 120\% \cdot \frac{t_s}{\frac{E_{noc}^{-1}(bbp)}{apr} - \frac{aps}{ls}}$$

where $E_{noc}^{-1}$ is an inverse Erlang B formula for the noc.

2. The method according to claim 1, wherein the number of packets per burst is within the lower limit.

3. The method according to claim 1, wherein the number of packets per burst is within the upper limit.

4. The method according to claim 1, wherein the average burst size (abs) is abs=aps·ppb.

5. The method according to claim 4,
wherein during the aggregation of packets a burst size is compared to a value and if the burst size is equal to or exceed this value, the burst is transmitted,
wherein the value is in the range between ±20%·abs.

6. The method according to claim 4, wherein the packets are aggregated into a buffer, the minimum size of the buffer is determined by aps·(ppb−d), where d is a constant between 0 and 5.

7. The method according to claim 6, wherein d is equal to 1.

8. The method according to claim 4, wherein the packets are aggregated into a buffer, the maximum size of the buffer is determined by aps·(ppb+e), where e is a constant between 0 and 5.

9. The method according to claim 8, wherein e is equal to 1.

10. The method according to claim 1, wherein when the packet is stored, a random binary digit with a probability for a first and second value of the binary digit is generated and compared with the first value of the binary digit, if equal the stored packets are sent as a burst, the probability for the first value is determined by:

$$\frac{1}{ppb}.$$

11. The method according to claim 1, wherein an average burst rate is determined by:

$$\frac{apr}{ppb}.$$

12. The method according to claim 1, wherein an average burst rate is determined by:

$$\frac{1}{\frac{1}{apr}+2\cdot mad}.$$

13. The method according to claim 1, wherein the average burst rate (abr) is determined by:

$$abr \leq \frac{E_{noc}^{-1}(bbp)}{ts+td}$$

where td is a burst duration time.

14. The method according to claim 1, wherein the packets are Internet Protocol (IP) packets.

15. The method according to claim 1, wherein the network is formed as an Optical Burst Switched network.

16. The method according to claim 1, wherein the node is an edge node of the network.

17. The method according to claim 13, wherein the burst is transformed and sent by the edge node as and optical burst into the Optical Burst Switched network.

* * * * *